United States Patent [19]

Schmid

[11] Patent Number: 5,166,514

[45] Date of Patent: Nov. 24, 1992

[54] OPTICAL PLUG SYSTEM FOR OPTICAL MEASURING DEVICE

[75] Inventor: Wolfgang Schmid, Stuttgart, Fed. Rep. of Germany

[73] Assignee: Wandel & Goltermann GmbH & Co., Eningen, Fed. Rep. of Germany

[21] Appl. No.: 666,854

[22] Filed: Mar. 8, 1991

[30] Foreign Application Priority Data

Apr. 9, 1990 [DE] Fed. Rep. of Germany ....... 4011462

[51] Int. Cl.$^5$ .............................................. H01J 5/16
[52] U.S. Cl. ................................. 250/227.11; 385/73
[58] Field of Search ...................... 250/227.11, 227.24; 385/73, 74, 55, 70

[56] References Cited

U.S. PATENT DOCUMENTS

| 4,027,153 | 5/1977 | Käch | 250/227.11 |
|---|---|---|---|
| 4,027,945 | 6/1977 | Iverson | 350/96 C |
| 4,053,764 | 10/1977 | Sierak et al. | 250/227.24 |
| 4,212,514 | 7/1980 | Prunier et al. | 385/73 |
| 4,255,016 | 3/1981 | Borsuk | 350/96.21 |
| 4,279,469 | 7/1981 | Forman | 350/96.22 |
| 4,487,475 | 12/1984 | Ogawa | 385/73 |
| 4,636,033 | 1/1987 | Gagen | 385/73 |
| 4,712,862 | 12/1987 | Lightstone | 350/96.21 |
| 4,758,719 | 7/1988 | Sasaki et al. | 250/227.24 |
| 4,850,664 | 7/1989 | Iri et al. | 350/96.21 |

FOREIGN PATENT DOCUMENTS

| 0056192A1 | 7/1982 | European Pat. Off. . |
|---|---|---|
| 0182577A3 | 5/1984 | European Pat. Off. . |
| 0176820A3 | 4/1986 | European Pat. Off. . |
| 0294270A1 | 12/1988 | European Pat. Off. . |
| 3148562 | 8/1982 | Fed. Rep. of Germany . |
| 3506844 | 9/1986 | Fed. Rep. of Germany . |
| 2045454B | 2/1983 | United Kingdom . |
| 21100465B | 7/1985 | United Kingdom . |

OTHER PUBLICATIONS

H. Naumann/G. Schroder "Bauelemente der Optik" Carl Hanser Verlag Munchen Wien, pp. 218, 219, 18, 19; Taschenbuch fur Konstrukteure.

W. S. Ludolf, Esslingen "Lichtwellenleiter-Verbindungstechnik", Feinwerktechnik & Messtechnik 96 (1988)4, pp. 151-154, Carl Hanser Verlag, Munchen 1988.

Bergmann and Schaefer-Lehrbuch der Experimentalphysik vol. 3, Optik, Walter de Gruyter New York, 1987.

Primary Examiner—Constantine Hannaher
Assistant Examiner—Kiet T. Nguyen
Attorney, Agent, or Firm—Herbert Dubno

[57] ABSTRACT

An optical plug connector for an optical measuring device between an internal light waveguide optical fiber and an external light waveguide optical fiber maintains a distance d between the ends of the fibers which is greater than the coherence length of the light to be transmitted through the coupling. In this manner, in spite of the presence of the air gap, interference phenomena are avoided.

8 Claims, 1 Drawing Sheet

OPTICAL PLUG SYSTEM FOR OPTICAL MEASURING DEVICE

FIELD OF THE INVENTION

My present invention relates to an optical measuring assembly having a plug connection for joining an external light waveguide, e.g. an optical fiber, with an internal light waveguide (e.g. an optical fiber) and, more particularly, to an optical plug connection for optical measuring devices having internal light waveguides of this type.

BACKGROUND OF THE INVENTION

It is known to provide an optical plug connection for optical measuring devices for the transmission of light signals to or the transmission of light signals from the optical measuring device utilizing light waveguides, i.e. optical fibers. A plug connector can be provided on the housing of the measuring device, in particular for joining an internal light waveguide with an external light waveguide, i.e. for providing the optical coupling between them. Conventional measuring devices utilizing optical connectors of this type operate exclusively on the butt-contact principle. The light conducting cores of the two light waveguides to be interconnected lie precisely aligned and as tightly as possible against one another.

Indeed, most plug connections of this type provide means for pressing the end face of one of the light waveguides against the end face of the other light waveguide to be coupled to the first.

If the system is to include an optical transmitter with a large coherence length, for example a laser diode, and is to use glass fibers as the light waveguides, the conventional approach has been to ensure contact between the optical fiber cores to be coupled for two reasons:

a) If an air gap would exist between the two fiber ends, a resonator would be formed because of the double glass-air reflection (glass-air interface/air-glass interface) which exists on both sides of the air gap. Even the smallest changes in the length of the air gap, for example, by temperature effects or changes in the laser wavelength or variations in the mode distribution in the case of multimode fibers (e.g. resulting from fiber bending) give rise to a change in the characteristics of the resonator and thus a variation in the transmission loss which can amount to several tenths of a dB. Such comparatively high loss fluctuations can be intolerable with measuring devices utilizing optical signals and, for this reason, in conventional systems every effort is made to avoid an air gap in the plug connector.

b) Modern semiconductor laser diodes are highly sensitive to reflections. An air gap in the plug connector which can result in about 4% reflection at each glass/air interface cannot be tolerated for most applications of the system. On this ground as well, prior measuring devices required plug-type connectors in which the two fibers were pressed together at least in their respective core regions to ensure a reliable contact between them.

The contacting fiber ends, however, have the disadvantage that even the smallest size dust or dirt particle in the contact region will suffice to cause the formation of a detrimental air gap and to so increase the transmission loss as to interfere with proper operation of the measuring device. In extreme cases, the fiber ends can be damaged.

For conventional plug connectors, therefore, the coupling of the fibers together must be carried out in a dirt-free manner so that before the connection of one light waveguide with another, the ends of the waveguides to contact one another must be carefully cleaned. This is a time-consuming process. With an optical measuring device, plug connections are made and disconnected repeatedly and an optical fiber may have to be connected to a number of devices. The cleaning operations involved and the danger of damage to the fiber ends is thereby greatly increased.

To avoid damage to the fiber ends in regions in which the fibers are to be coupled together in a plug, it is possible to provide between the fiber ends, a fluid light-conducting medium, for example, a so-called index-matching oil. However, the use of the oil has long-term effects which introduce undefinable inaccuracies and limit the reliability of the system.

In the technical manual Feinwerktechnik & Messtechnik 96 (1988) 4, P. 151 to 154, a plug connection has been described which provides a lens arrangement between the ends to be connected by the plug connector. A lens arrangement of this type reduces the effect of contamination in the region of an end face of a plug upon the damping by comparison with direct connection plugs. However this assembly is complex to manufacture and thus correspondingly expensive since the ball-type lenses used must be fabricated with high precision.

Some background as to the problems of earlier connectors can be derived from German patent documents DE 35 06 844 and DE 31 48 562, as well as a publication in the names of Naumann/Schroder "Bauelemente der Optik", Carl Hanser Verlag Munchen Wien 1983, pp. 18, 19, 218, 219.

These publications disclose various optical connecting systems and theoretical considerations of the transmission in the region of the plug connectors.

OBJECTS OF THE INVENTION

It is, therefore, the principal object of the present invention to provide an optical plug connector for optical measuring units which avoids the possibility of damage to the fiber ends and affords reproducible loss values for the connector.

Another object of the invention is to provide an improved optical measuring assembly with a plug connector between an external light waveguide and an internal light waveguide whereby drawbacks of earlier systems are avoided.

Still another object of my invention is to eliminate the specific problems outlined above with respect to systems having direct contact between fiber ends, systems requiring lenses to be interposed between them and systems using index-watching oil or other difficult-to-handle media to optically couple the fibers.

SUMMARY OF THE INVENTION

These objects and others which will become apparent hereinafter are attained, in accordance with the invention, in an optical measuring assembly comprising:

an optical measuring device for use with light having a coherence length $l_c$ and having an internal light waveguide having a connection end, and a plug connector into which the internal light waveguide extends at the connection end;

an external light waveguide having a connection end extending into the plug connector and optically communicating therein with the connection end of the internal light waveguide for the transmission of the light therebetween; and means for maintaining a distance d between the connection ends which is greater than the coherence length $l_c$.

When the light is generated by a light-emitting diode, the distance d is greater than the coherence length $l_c = \lambda_0^2/\Delta\lambda$, where $\lambda_0$ is the central maxiumum wavelength and $\Delta\lambda$ is the spectral halfwidth of the light generated by the light-emitting diode.

In a laser system, the optical measuring assembly can comprise:

an optical measuring device having a laser light source producing coherent light, an internal light waveguide formed as a multimode optical fiber having a connection end, and a plug connector into which the internal light waveguide extends at the connection end;

an external light waveguide having a connection end extending into the plug connector and optically communicating therein with the connection end of the internal light waveguide for the transmission of the light therebetween; and means for maintaining a predetermined distance between the connection ends.

The invention can also include a method of reducing interference in an optical measuring assembly wherein an optical measuring device has a laser light source producing coherent light, an internal light waveguide formed as a multimode optical fiber having a connection end, and a plug connector into which the internal light waveguide extends at the connection end and an external light waveguide having a connection end is inserted into the plug connector and optically communicates therein with the connection end of the internal light waveguide for the transmission of the light therebetween, the method comprising the step of grinding back at least one of the ends for maintaining a predetermined distance between the connection ends within the plug connector, the plug connector being constructed to cause the ends to abut absent the grinding back.

By providing the ends of the light waveguides which are coupled together in the plug connector at the distance d which is greater than the coherence length of the transmitted light, I am able to ensure that no interference can occur.

The reflections at the glass/air interfaces, do indeed provide a loss but only a defined loss which is independent of small distance changes as long as the distance between the fiber ends is greater than the coherence length.

The air gap between the fiber ends is thus chosen to be so large that plug tolerances and other effects on the air gap do not reduce the distance d to a value less than the coherence length in operation and use of the system. The plug connector of the invention has the advantage that one need not operate with inconvenient media such as immersion oil and nevertheless can eliminate the danger of damage to the fiber ends.

The coherence length is defined by the equation $l_c = \lambda_0^2/\Delta\lambda$.

From this equation, the following typical values are obtained for $\lambda_0 = 1300$ nm.

$l_c \approx 20$ μm for LED $l_c \approx 1$ m for Laser

In the case of a light-emitting diode (LED), the air gap in the above case must be greater than or equal to 20 μm to assure that no interference can occur as a result of the presence of the gap.

A similar advantage can be obtained also for lasers by providing the predetermined distance between the connection ends wherein the internal light waveguide is a multimode fiber with high dispersion, for example, a step index fiber. In this case, a progation delay difference between the individual modes is obtainable. When this transit time difference is greater than the coherence time of the laser at the transmission gap between the fibers, no interference can occur. For a laser, as an optical transmitter, the coherence time amounts to:

$t_c < 1$ ns.

If one uses stepped index fibers with a mode dispersion of:

$t_F > 1$ ns, interference is suppressed even though only short fiber lengths are required.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
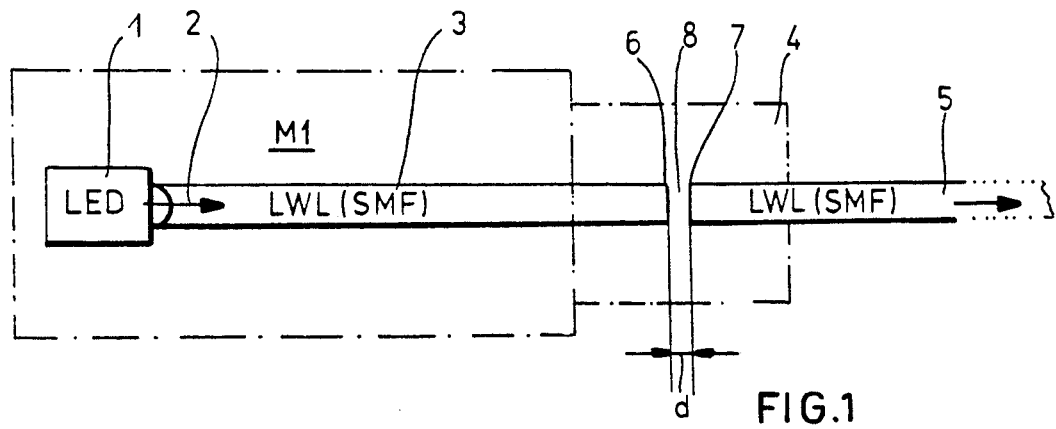
FIG. 1 is a diagram illustrating a measuring unit having a light-emitting diode as an optical transmitter and provided with a plug connection according to the invention.

The measuring device M1 shown diagrammatically in dot-dash lines in FIG. 1 is provided with an optical transmitter formed by a light-emitting diode (LED) 1. The light 2 from the LED 1 passes through an internal light waveguide (LWL) 3 which can be a single-mode fiber (SMF) terminating in a plug connector. The internal light waveguide 3 can also be a multimode fiber (MMF) if desired.

At the output of the measuring device M1, a plug connector 4 is provided in which the internal light waveguide 3 is optically coupled to an external light waveguide 5 which is shown as a single fiber. The coupling or connector 4 and the light waveguides 3 and 5 thus together form an optical plug connection.

The ends 6 and 7 of the two light waveguides 3 and 5 are spaced apart by distance d to form an air gap between them, this distance d being sufficiently large as to preclude the formation of interference in the region between the ends 6 and 7.

More particularly, the distance d is made larger than the coherence length $l_c$ of the light 2 emitted by the diode 1. The coherence length $l_c$ is given by the equation $l_c = \lambda_0^2/\Delta\lambda$, where $\lambda_0$ is the centeral wavelength and $\Delta\lambda$ is the spectral halfwidth of the light generated by the light-emitting diode.

Figure 2:
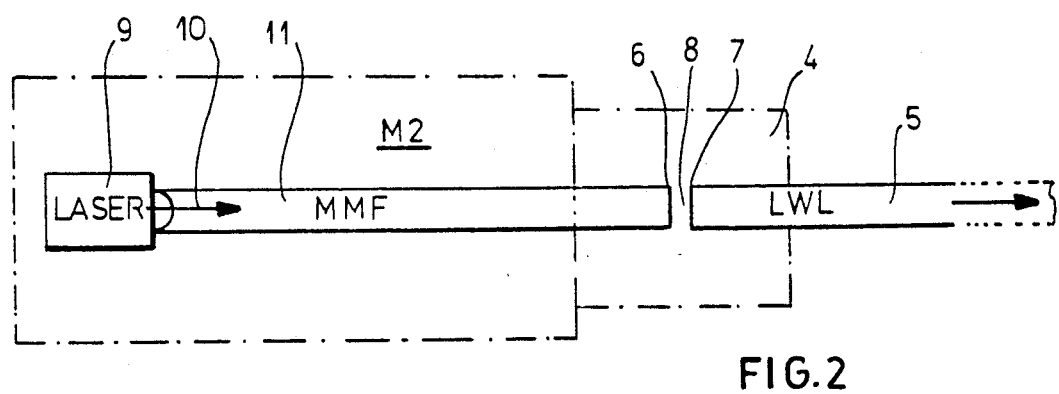
FIG. 2 is a similar view showing the principles of the invention as applied to a unit having a laser source.

In the embodiment of FIG. 2, the measuring unit 2 is also schematically shown but has, as its light transmitter or source, a laser 9. The light 10 transmitted from the laser 9 is fed to a multimode fiber 11.

In this embodiment as well, where the internal light waveguide 11 is formed as a multimode fiber, the fiber ends 6 and 7 are spaced apart by an air gap in the plug connector 4. The plug connector 4, togehter with the light waveguides 5 and 11, form an optical plug connection. The transit time differences between the individual modes traversing the multimode fiber 11, by a corresponding choice of the multimode fiber, is greater than the coherence time of the laser, thereby practically eliminating the possibility of interference phenomenon in the region of the air gap 8. An interference process thus cannot occur in the transmission from the internal waveguide 11 to the external waveguide 5.

Figure 3:
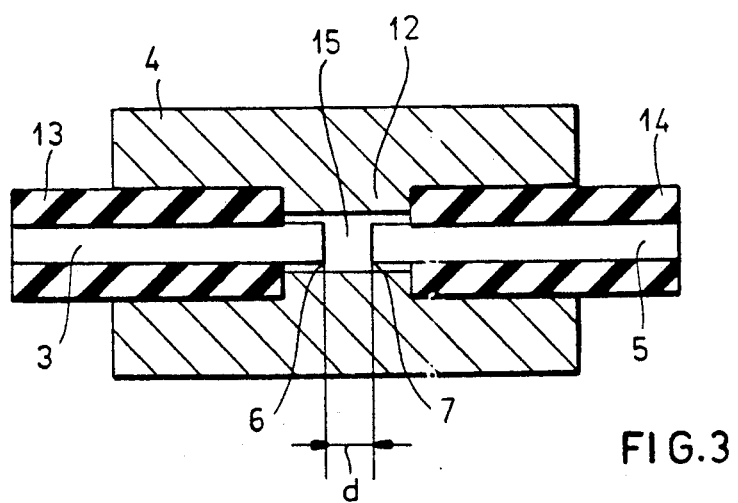
FIG. 3 is a cross sectional view through a diagrammatically illustrated plug connector representing a detail of the system of FIG. 1 or FIG. 2.

In FIG. 3, I have shown a plug connector 4 which can be of the type described, for example, in connection with FIG. 1 but which is shown in greatly enlarged scale.

The details of the plug connector 4, however, have not been shown. What is important is that the fiber ends 6 and 7 are held apart by the distance d between the ends 6 and 7. This is done by grinding down one or both of the ends 6 and 7 and polish it or them by an amount sufficient to form the distance d when a commercial plug, which would normally causes the ends 6 and 7 to bear upon one another, is used. In this case, the fiber is set back with respect to the part of the pin or sheath as it is inserted into the plug connector to ensure the proper spacing 8.

I claim:

1. An optical measuring assembly, comprising:
   an optical measuring device for use with light generated by a light-emitting diode and having a coherence length $$l_c = \lambda_0^2 / \Delta\lambda,$$

where $\lambda_0$ is the central wavelength and $\Delta\lambda$ is the spectral halfwidth of the light generated by said light-emitting diode, and having an internal light waveguide having a connection end, and a plug connector into which said internal light waveguide extends at said connection end;
   an external light waveguide having a connection end extending into said plug connector and optically communicating therein with said connection end of said internal light waveguide for the transmission of said light therebetween; and
   means for maintaining a distance d between said connection ends across and empty space which is greater than said coherence length $l_c$.

2. An optical measuring assembly, comprising:
   an optical measuring device having a laser light source producing coherent light, an internal light waveguide formed as a multimode optical fiber having a connection end, and a plug connector into which said internal waveguide extends at said connection end;
   an external light waveguide having a connection end extending into said plug connector and optically communicating therein with said connection end of said internal light waveguide for the transmission of said light therebetween; and
   means for maintaining a predetermined distance across an empty space between said connection ends.

3. The assembly defined in claim 2 wherein the propagation delay difference between the individual modes in said multimode fiber is greater than the coherence time of said laser.

4. The assembly defined in claim 3 wherein said multimode fiber is a step-index optical fiber.

5. The assembly defined in claim 4 wherein said distance is produced by grinding back at least one of said ends.

6. The assembly defined in claim 2 wherein said multimode fiber is a step-index optical fiber.

7. The assembly defined in claim 6 wherein said distance is produced by grinding back at least one of said ends.

8. A method of reducing interference in an optical measuring assembly wherein an optical measuring device has a laser light source producing coherent light, an internal light waveguide formed as a multimode optical fiber having a connection end, and a plug connector into which said internal light waveguide extends at said connection end and an external light waveguide having a connection end is inserted into said plug connector and optically communicates therein with said connection end of said internal light waveguide for the transmission of said light therebetween, said method comprising the step of grinding back at least one of said ends for maintaining a predetermined distance between said connection ends within said plug connector, said plug connector being constructed to cause said ends to abut absent the grinding back.

* * * * *